US008848525B2

(12) United States Patent
Li

(10) Patent No.: US 8,848,525 B2
(45) Date of Patent: Sep. 30, 2014

(54) METHODS, SYSTEMS, AND COMPUTER READABLE MEDIA FOR PROVIDING ADAPTIVE JITTER BUFFER MANAGEMENT BASED ON PACKET STATISTICS FOR MEDIA GATEWAY

(75) Inventor: Yuan Li, Shanghai (CN)

(73) Assignee: Genband US LLC, Plano, TX (US)

( * ) Notice: Subject to any disclaimer, the term of this patent is extended or adjusted under 35 U.S.C. 154(b) by 720 days.

(21) Appl. No.: 12/482,217

(22) Filed: Jun. 10, 2009

(65) Prior Publication Data

US 2010/0315960 A1  Dec. 16, 2010

(51) Int. Cl.
*H04L 12/26* (2006.01)
*H04L 12/841* (2013.01)
*H04L 1/20* (2006.01)
*H04L 12/24* (2006.01)

(52) U.S. Cl.
CPC .......... *H04L 43/087* (2013.01); *H04L 12/2665* (2013.01); *H04L 43/00* (2013.01); *H04L 47/283* (2013.01); *H04L 41/0803* (2013.01); *H04L 12/2602* (2013.01); *H04L 1/205* (2013.01)
USPC ......... 370/230.1; 370/235; 370/238; 370/516

(58) Field of Classification Search
CPC . H04L 43/087; H04L 43/0852; H04L 43/858; H04L 1/205; H04L 12/2665

USPC ....................... 370/252, 516, 230.1, 235, 238
See application file for complete search history.

(56) References Cited

U.S. PATENT DOCUMENTS

| 7,529,276 | B1 * | 5/2009 | Ramakrishnan | 370/516 |
| 7,701,980 | B1 * | 4/2010 | Bugenhagen | 370/516 |
| 2002/0037003 | A1 * | 3/2002 | Windecker | 370/352 |
| 2006/0146713 | A1 * | 7/2006 | Makowski et al. | 370/236 |
| 2008/0080702 | A1 * | 4/2008 | Zhang et al. | 379/406.08 |

* cited by examiner

*Primary Examiner* — Omer S Mian
(74) *Attorney, Agent, or Firm* — Jenkins, Wilson, Taylor & Hunt, P.A.

(57) ABSTRACT

Methods, systems, and computer readable media for providing adaptive jitter buffer management based on packet statistics for media gateway are disclosed. According to one aspect, the subject matter described herein includes a system for providing adaptive jitter buffer management based on packet statistics for a media gateway. The system includes a media gateway for communicating data between entities in one or more telecommunication networks. The media gateway includes first and second network interfaces for interfacing with the one or more telecommunication networks, a packet monitor for monitoring and maintaining packet statistics for channels established between the first and second network interfaces, each channel including a jitter buffer for buffering packets received on the first or second network interface, and a jitter buffer adjustment module for dynamically adjusting jitter buffer size on a per-channel basis based on the packet statistics maintained for each channel.

23 Claims, 3 Drawing Sheets

METHODS, SYSTEMS, AND COMPUTER READABLE MEDIA FOR PROVIDING ADAPTIVE JITTER BUFFER MANAGEMENT BASED ON PACKET STATISTICS FOR MEDIA GATEWAY

TECHNICAL FIELD

The subject matter described herein relates to communications involving a media gateway. More particularly, the subject matter described herein relates to methods, systems, and computer readable media for providing adaptive jitter buffer management based on packet statistics for a media gateway.

BACKGROUND

In legacy telecommunications networks, a communication between two parties, usually bidirectional, required the reservation of a path or circuit between the two parties. This type of network was referred to as a "circuit-switched" network since the two-way communication, herein referred to as a "call", took place using resources, e.g., physical circuits, that were dedicated for the exclusive use by that call for the duration of the call. A large percentage of a typical voice call consists of silence. During periods of silence, no information is communicated between the parties, and the resources dedicated to the call in a circuit-switched are not necessary during these periods of silence. In circuit-switched networks, however, these resources cannot be put to use for another call during these periods of silence. Thus, resources in a circuit-switched network that are dedicated to a call with large portions of silence, such as a voice call, are often largely underutilized.

With the advent of digital packet networks, such as the Internet, there is a trend towards sending calls over packet-switched networks rather than circuit-switched networks. For example, voice over Internet protocol, or VoIP, is a protocol which allows voice calls to be sent over the Internet or other packet-switched network that supports the Internet protocol (IP). By using a packet-switched protocol rather than a circuit-switched protocol, it is possible for multiple simultaneous calls to share the same network resources, in part because no data is communicated between the parties of a call if both parties are silent, and the unused bandwidth is thus available for use by other calls. In this manner, the network bandwidth may be shared among multiple calls in a way that allows the full bandwidth of the network to be used.

However, one disadvantage of using a packet-switched network is that since the available bandwidth is shared by many calls, the latency, i.e., the time that it takes for a packet to get from source to destination, and throughput, i.e., the amount of packets that will travel from source to destination in a given amount of time, is not always constant and may vary depending on the instantaneous load on the network. The variation of network latency over time is referred to as "jitter".

Also, most packet-switched networks are designed to allow a packet that is going from point A to B to travel one of potentially many paths through the network. By having more than one path from A to B, the network will still sustain traffic from A to B even if one of the paths is down or out of service. If one path from A to B is down, then packets will use another path from A to B. While this resiliency is advantageous because it increases overall reliability of the network, a side effect of this resiliency is that packets in the same call may travel different paths. Because each of the different paths may have different latency and throughput characteristics, packets sent in a particular sequence from A may arrive out of sequence at B. Even if the packets arrive in sequence, the packets may suffer various amounts of jitter.

This characteristic of packet-switched networks is not a problem if it doesn't matter whether data that is being communicated from point A to point B arrives in order or within a certain allowable delay. For example, for a bulk file transfer from A to B across the network, it largely does not matter whether the transfer rate was constant or not. However, because VoIP calls happen in real time, the quality of the call suffers if the voice data stream between A and B starts and stops or if the throughput varies wildly. In short, VoIP calls require a relatively constant throughput, i.e., with little to no "jitter".

One approach that has been used to mitigate network jitter is to use what is commonly referred to as a jitter buffer, which is a temporary storage, often a first-in, first-out (FIFO) queue, which receives packets at irregular intervals due to network jitter, and which outputs the packets at regular intervals, i.e., having no jitter. The buffer must be designed to be large enough to be able to continue to periodically output packets from the queue while waiting for the arrival of the next packet in the series, which may be delayed due to network jitter. The size that the jitter buffer must be is a function of the maximum amount of jitter that might be suffered by the incoming packet stream—the larger the potential jitter, the larger the jitter buffer must be. Larger jitter buffers require larger amounts of memory to be set aside for the jitter buffers exclusive use.

Many circuit-switched networks also use jitter buffers to accommodate the levels of jitter exhibited by these kinds of networks. However, the levels of jitter seen in packet networks may be many orders of magnitude greater than levels of jitter seen in circuit-switched networks, and thus require relatively large jitter buffers compared to jitter buffers used for circuit-switched networks.

The problem is compounded whenever a packet network and a circuit-switched network interact, such as in a media gateway, which is a network node that provides an interface between a circuit-switched network, such as the public switched telephone network (PSTN), and a packet-switched network, such as the Internet. Such as node must manage jitter on both networks and also between both networks.

Conventional implementations of jitter buffers create jitter buffers big enough to tolerate the maximum jitter that may occur in each network or across the networks. However, this approach wastes resources by allocating more memory for the jitter buffer than may actually be needed by that network or at that time.

Accordingly, in light of these disadvantages associated with jitter over packet-switched networks, there exists a need for methods, systems, and computer readable media for providing adaptive jitter buffer management based on packet statistics for a media gateway.

SUMMARY

According to one aspect, the subject matter described herein includes a system for providing adaptive jitter buffer management based on packet statistics for a media gateway. The system includes a media gateway for communicating data between entities in one or more telecommunication networks. The media gateway includes first and second network interfaces for interfacing with the one or more telecommunication networks, a packet monitor for monitoring and maintaining packet statistics for channels established between the first and second network interfaces, each channel including a jitter buffer for buffering packets received on the first or second network interface, and a jitter buffer adjustment module for dynamically adjusting jitter buffer size on a per-channel basis based on the packet statistics maintained for each channel.

According to another aspect, the subject matter described herein includes a method for providing adaptive jitter buffer management based on packet statistics for a media gateway. At a media gateway having first and second network interfaces for interfacing with one or more telecommunication networks, packets associated with a plurality of channels established between the first and second network interfaces, each channel including a jitter buffer for buffering packets received on the first or second network interface, are received. Packet statistics for each channel are monitored and maintained. The jitter buffer size is dynamically adjusted on a per-channel basis based on the packet statistics maintained for each channel.

The subject matter described herein for providing adaptive jitter buffer management based on packet statistics for a media gateway may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, systems, methods, and computer readable media are provided for adaptive jitter buffer management based on packet statistics for a media gateway.

Figure 1:
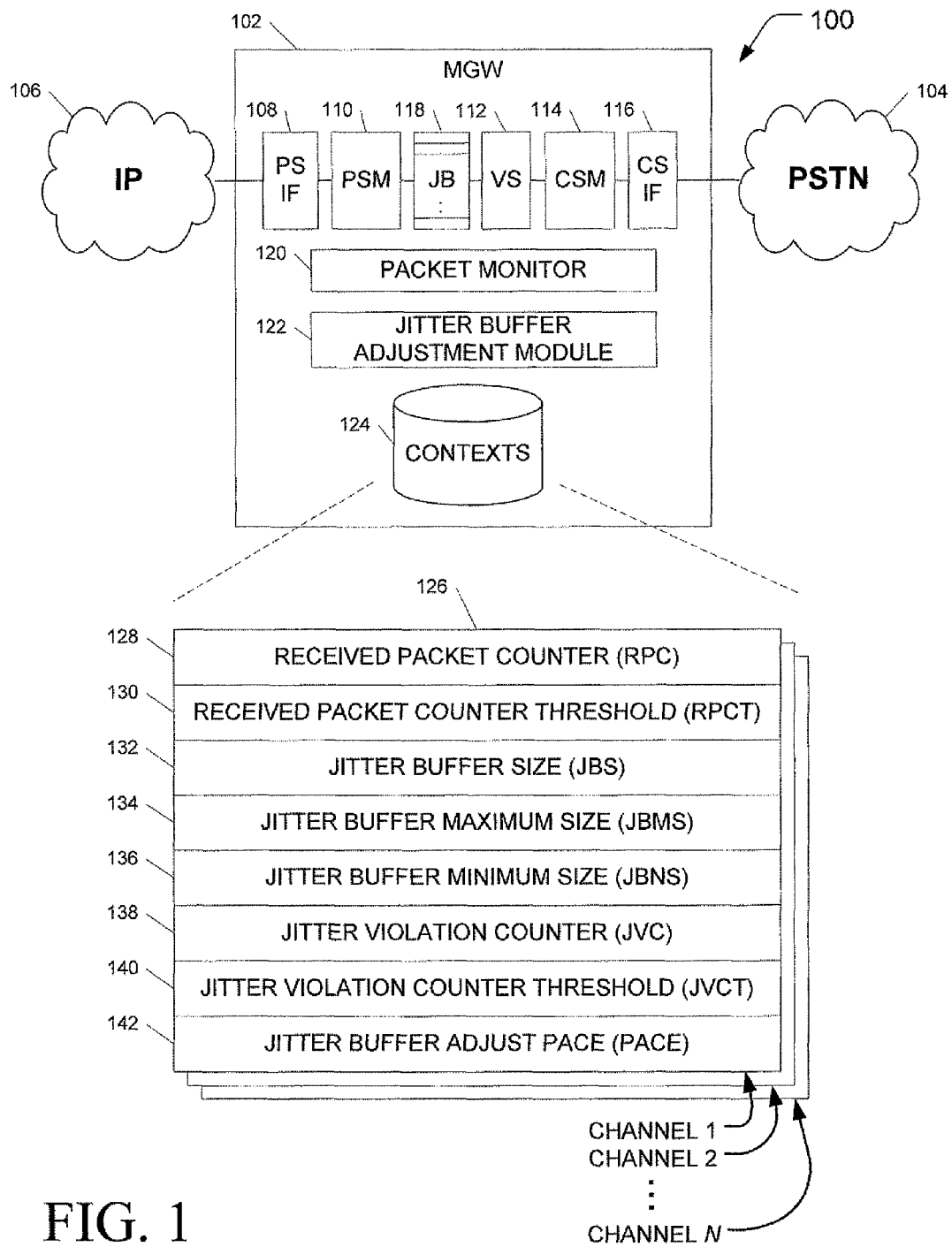
FIG. 1 is a block diagram illustrating a system for providing adaptive jitter buffer management based on packet statistics for a media gateway according to an embodiment of the subject matter described herein.

FIG. 1 is a block diagram illustrating a system for providing adaptive jitter buffer management based on packet statistics for a media gateway according to an embodiment of the subject matter described herein. System 100 includes a media gateway (MGW) 102 for providing an interface between disparate types of networks. In the embodiment in illustrated in FIG. 1, MGW 102 connects a circuit-switched network (CSN) 104 and a packet-switched network (PSN) 106. In one embodiment, CSN 104 may be a public switched telephone network (PSTN) and PSN 106 may be an Internet protocol (IP) network. Media gateway 102 provides a dynamic jitter buffer for each data channel.

As used herein, the term "channel" generically refers to the logical path through MGW 102 along which two entities communicate, and the term "call" refers to any data communication between the two entities. More specifically, the term channel refers to the physical path that call messages use to travel through MGW 102. For example, in the embodiment illustrated in FIG. 1, a packet may be received at one of multiple packet network interfaces (PSIF) 108, be routed through packet switch matrix (PSM) 110 to one of multiple voice servers (VS) 112, which convert the packet format to TDM format. The TDM data is then routed through circuit switch matrix (CSM) 114 to one of multiple circuit-switched network interfaces (GSIF) 116, either of which may include a TDM framer/deframer to multiplex data streams into particular slots within the TDM frame. Since each channel is a logical connection between two network entities, each channel may have its own unique jitter characteristics.

In the embodiment illustrated in FIG. 17 MGW 102 provides a set of jitter buffers (JB) 118, one jitter buffer for each distinct channel. In this embodiment, an example channel is the physical path from one of the packet switched network interfaces 108 through the packet switching matrix PSM, one of the jitter buffers 118, one of the voice servers 112, through the circuit switching matrix 114, to one of the circuit-switched interfaces 116. If the circuit-switched network uses a time division multiplexing (TDM) protocol, for example, a channel may occupy one or more slots of the TDM frame. Thus, the term "channel" may refer to the specific collection of particular physical resources occupied or used by the call as it passes through MGW 102.

In one embodiment, each jitter buffer is a first-in first-out (FIFO) buffer, which may be implemented using a circular buffer in memory, with a write pointer that points to the next available space in the circular buffer and a read pointer that points to the next piece of data in the buffer that is to be read. Typically, the beginning and end of the circular buffer are also indicated. For example, one pointer may be used to point to the first memory location of the circular buffer and a second pointer may be used to point to the last memory location of the circular buffer. Alternatively, a pointer may indicate the first memory location of the circular buffer and a buffer size value is used to calculate the last memory location of the circular buffer.

The size of the jitter buffer may be dynamically adjusted based on the observed jitter characteristics, also called a jitter profile, of the particular channel. Because a packet network is asynchronous, i.e., packets can arrive at any time and are not tied to a particular clock, packet networks typically have orders of magnitude more jitter than TDM networks, which issue periodic frames, or synchronous networks that require all transceivers to be aligned to a master system clock. For this reason, in one embodiment, the jitter buffer may be located in the packet domain of MGW 102. For example, in the embodiment illustrated in FIG. 1, jitter buffers 118 are positioned between packet switching matrix 110 and the voice servers VS 112. However, since TDM channel interfaces typically have read and write queues for storing data that is to be multiplexed into TDM frames, jitter buffers 118 may alternatively located in the TDM domain, such as between VS 112 and circuit switch matrix 114, and may be integrated with or within the read and write queues. Thus, a jitter buffer may be associated with each packet network path, for example, with each PSTN channel, or with both.

In the embodiment illustrated in FIG. 1, MGW 102 includes a packet monitor 120 for monitoring and maintaining packet statistics for channels established between the first and second network interfaces and a jitter buffer adjustment module 122 for dynamically adjusting jitter buffer size on a per-channel basis based on packet statistics maintained for each channel. In one embodiment, MGW 102 may include a database, a table, memory, or other data storage means 124 for maintaining packet statistics.

In one embodiment, a data structure, called a context 126, may be used for maintaining packet statistics and other information about a channel. Context 126 may maintain several pieces of information. In the embodiment illustrated in FIG. 1, each context 126 may include a received packet counter (RPC) 128 for keeping track of the number of packets that have been received on the packet interface and a received packet counter threshold (RPCT) 130, which indicates how many packets must be received before the jitter buffer size should be re-evaluated. Once the jitter buffer size is re-evaluated, the value of RPC 128 may be set to zero if RPC 128 is an up-counter or to RPCT 130 if RPC 128 is a down-counter.

Context 126 may keep track of the current jitter buffer size (JBS) 132, and may define a jitter buffer maximum size (JBMS) 134 and a jitter buffer minimum size (JBNS) 136. Each buffer has a data source, fills (supplies data to) the buffer, and a data sink, which pulls (removes) data from the buffer.

If the jitter buffer is too small, the buffer may underrun or overrun too easily. A buffer underruns when the buffer is empty, i.e., there is no data left in the buffer because the data sink pulls data from the buffer faster than the data source can fill the buffer. A buffer overruns when the buffer is full, i.e., there is no more room in the buffer for incoming data, because the data source fills the buffer faster than the data sink can empty it. Underrun and overrun may be avoided by defining an appropriate value for JBNS 136.

Note that the speed at which the data source fills data, called the source data rate, and the speed at which the data sink pulls data, called the sink data rate, are typically comparable to each other. The jitter buffer is typically necessary only to accommodate the variability of one or both of the data rates. This variability is what gives rise to jitter.

Where a packet network is the jitter buffer data source and a TDM network is the jitter buffer data sink, a data stream from the packet network to the TDM network must fill the jitter buffer to a certain threshold, often between 50% and 100% of the buffer capacity, before the data sink is allowed to pull data from the jitter buffer, a process often referred to as "buffering the data stream". The interval between the time that data source first starts filling the buffer and the time that the data sink is first allowed to pull data from the buffer is referred to as the "buffer interval". If the jitter buffer is very large, the buffer interval is also proportionately large, since it takes more time to fill a 1-megabyte buffer to some percentage than it takes to fill a 10-byte buffer to the same percentage. Thus, increasing a buffer's size may not affect throughput of the data stream but it will increase the response time—i.e., the interval between the request for a data stream and the time that the requested data stream arrives—because the response time includes the buffer interval. Response time can be kept to a reasonable value by defining an appropriate value for JBMS 134.

Context 126 may include a jitter violation counter (JVC) 138 for keeping track of the number of jitter violations that occur, and a jitter violation counter threshold (JVCT) 140, which defines the number jitter violations that will trigger a re-evaluation of buffer size. Examples of jitter violations include buffer underruns and overruns. Detection of other types of jitter violations, such as excessive delay time between subsequent packets, are also within the scope of the subject matter described herein.

Thus, in one embodiment, a jitter buffer size re-evaluation may occur after a certain number of packets have been received and/or after a certain number of jitter violations have been detected. In other embodiments, jitter buffer size re-evaluation may be triggered by other conditions, such as system reset or power-up, detection of an error for a fault, reconfiguration of MGW 102 or other nodes in the networks, etc.

Context 126 may define a jitter buffer adjust pace (PACE) 142, which defines an amount by which the jitter buffer should be adjusted up or down. In one embodiment, PACE 142 may be a constant value, such as a number of bytes. For example, PACE 142 may be set to 16, indicating that when a jitter buffer size is increased, it should be increased by 16 bytes and when a jitter buffer size is decreased, it should be decreased by 16 bytes. In an alternative embodiment, PACE 142 may be a constant, a ratio, or a multiplier. For example, PACE 142 may be set to 50%, meaning that the jitter buffer size will be increased or decreased by 50%. For a jitter buffer that is 16 bytes, it will be increased by 50% (8 bytes) to 24 bytes. If increased again, it will increase by 50% (12 bytes) to 36 bytes. A 16 byte buffer would be decreased by 50% (8 bytes) to 8 bytes, and decreased again by 50% (4 bytes) to 4 bytes, and so on. In one embodiment, the adjusted jitter buffer size JBS 132 is then checked to make sure that its new value is still within the limits defined by JBMS 134 JBNS 136.

Figure 2:
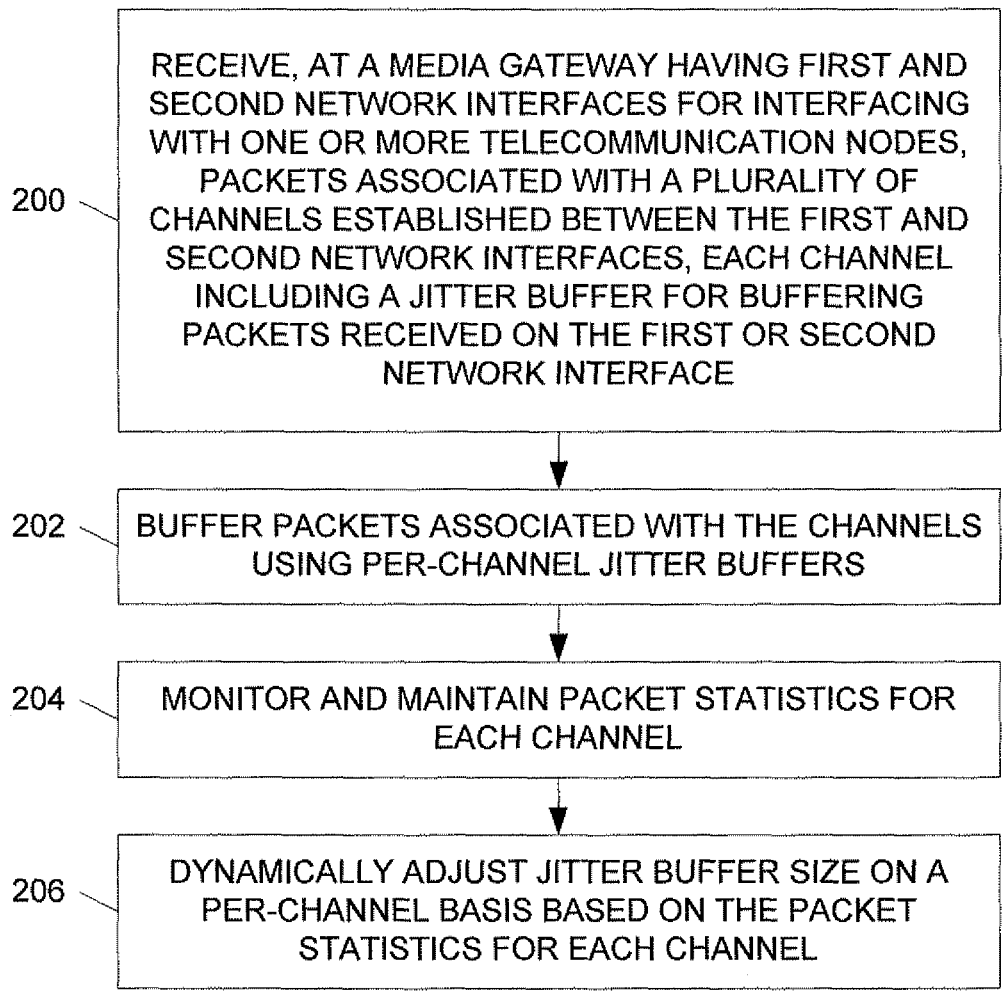
FIG. 2 is a flow chart illustrating an exemplary process for providing adaptive jitter buffer management based on packet statistics for a media gateway according to an embodiment of the subject matter described herein.

FIG. 2 is a flow chart illustrating an exemplary process for providing adaptive jitter buffer management based on packet statistics for a media gateway according to an embodiment of the subject matter described herein. At block 200, packets are received at a media gateway having first and second network interfaces for interfacing with one or more telecommunication networks. The packets are associated with multiple channels established between the first and second network interfaces. For example, in the embodiment illustrated in FIG. 1, an example channel is the physical path through MGW 102 connecting one of the packet-switched network interfaces 108 to one of the circuit-switched network interfaces 116, going through PSM 110, one of the jitter buffers 118, one of the voice servers 112, and CSM 114.

At block 202, the packets associated with a channel are buffered using per-channel jitter buffers. For example, one of the jitter buffers 118 may be assigned to a particular channel. Packets arriving at a PSIF 108 are routed through PSM 110 to the appropriate JB 118, where they are buffered. JB 118 may periodically issue a packet to VS 112, which converts from a packet-switched format to a circuit-switched format and sends the converted data to CSM 114, which routes the data to the appropriate CSIF 116.

At block 204, packet statistics for each channel are monitored and maintained. For example, packet monitor 120 may monitor information about the channel such as received packet count and jitter violation count and store this information in RPC 128 and JVC 138 fields, respectively, of a context 126 associated with the particular channel.

At block 206, jitter buffer size is dynamically adjusted on a per-channel basis based on the packet statistics maintained for each channel. This process will be described in more detail in FIG. 3, below.

Figure 3:
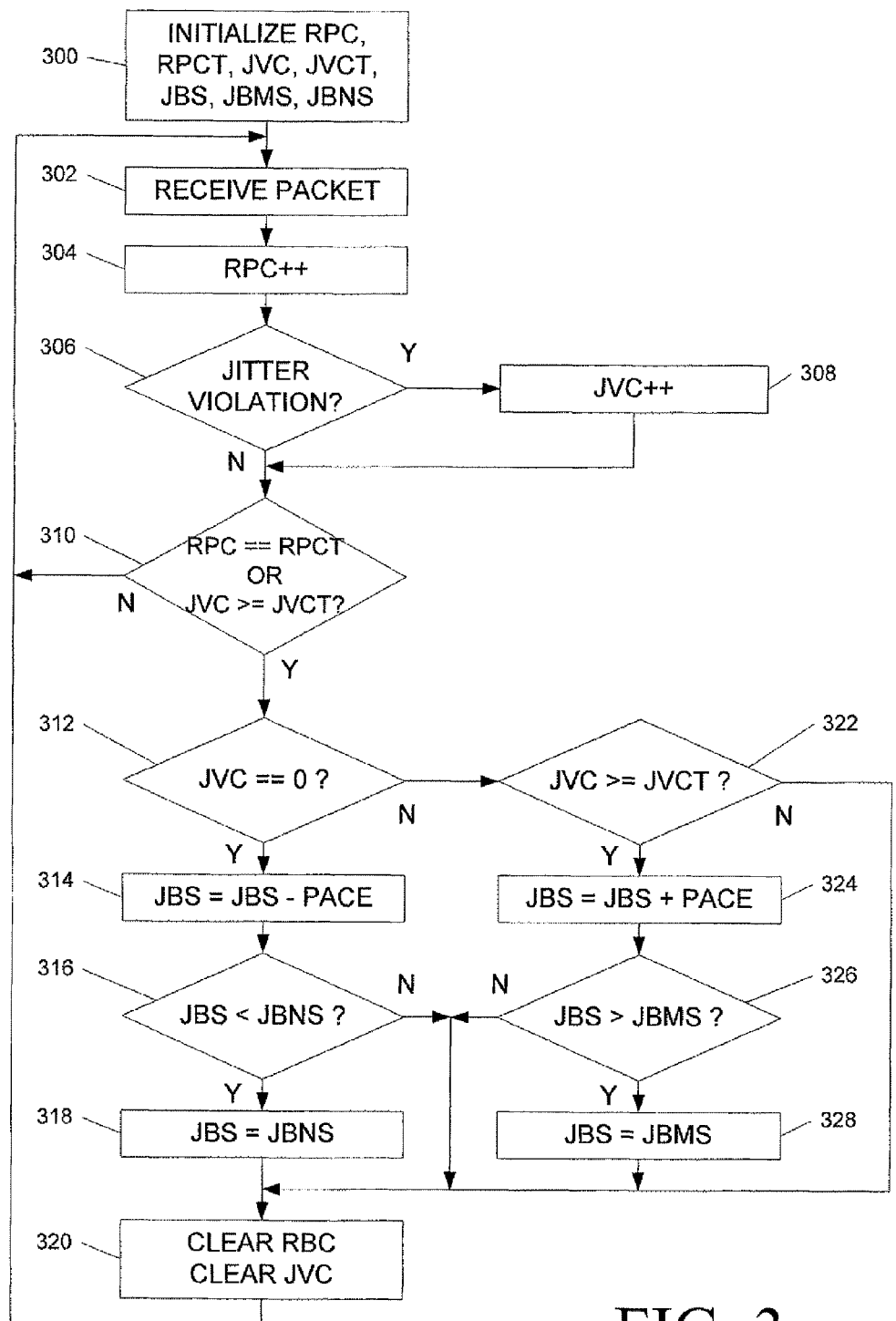
FIG. 3 is a flow chart illustrating in more detail an exemplary process for providing adaptive jitter buffer management based on packet statistics for a media gateway according to an embodiment of the subject matter described herein.

FIG. 3 is a flow chart illustrating in more detail an exemplary process for providing adaptive jitter buffer management based on packet statistics for a media gateway according to an embodiment of the subject matter described herein. Referring to FIG. 3, at block 300, the data values for a new context 126 are initialized. For example, if RPC 128 and JVC 138 are up-counters, their values may be set to zero. RPCT 130 and JVCT 140 may be set to a non-zero threshold value. JBMS 134 and JBNS 136 may be set to the appropriate maximum and minimum value. JBS 132 may be set to an initial value, such as halfway between JBMS 134 and JBNS 136. PACE 142 is also set to a value. These values may be system-wide defaults, or they could be node-specific defaults tailored for the particular node, in this case MGW 102. Alternatively, different initialization values may be used for different types of data streams. Using JBMS 134 and JBNS 136 as an example, it may be desirable to have a low latency for voice calls, which can tolerate some data loss due to underrun/overrun. Here, data loss may be an acceptable tradeoff in exchange for low latency. Thus, JBMS 134 and JBNS 136 may be set to relatively low values for voice calls. On the other hand, it may be desirable to minimize data loss for data transmissions, such as file transfers, in which case large latencies are an acceptable tradeoff in exchange for less data loss. Thus, JBMS 134 and JBNS 136 may be set to relatively large values for file transfers. JBS 132 and PACE 142 may likewise be set to according to a system-wide default, a node-specific default, a data-type-specific default, or other default.

At block 302, a packet is received at MGW 102. At block 304, received packet counter RPC 128 is incremented. In one embodiment, RPC 128 may be incremented for every packet received by MGW 102, regardless of which channel the packet is associated with. Alternatively, RPC 128 of a particular context 126 is incremented only when a packet is received on the particular channel associated with the particular context 126.

At block 306, if a jitter violation has occurred, the process flow goes to block 308, at which the jitter violation counter JVC 138 is incremented, and then to block 310. If a jitter violation has not occurred, the process flow goes from block 306 to block 310 directly. In one embodiment, a jitter violation occurs when a jitter buffer overruns or underruns. For example, where the jitter buffer is a circular buffer having a read pointer and a write pointer, an underrun occurs whenever the read pointer catches up to the write pointer, i.e., when there is no more data in the buffer to be read. In this example, an overrun occurs whenever the write pointer wraps around and catches up to the read pointer, i.e., when there is no more space in the buffer to write new data. Thus, a jitter buffer violation may occur whenever the read pointer and the write pointer point to the same address. This condition may be tested for by software, e.g., "if (readPtr==writeptr) then JVC++" or by hardware, e.g., readPtr bitwise ANDed with writePtr. These examples are illustrative and not intended to be limiting. Other means of detecting a jitter violation are considered to be within the scope of the subject matter described herein.

At block 310, the two conditions that trigger a re-evaluation of jitter buffer size are checked. A jitter buffer size re-evaluation occurs if either received packet counter RPC 128 has reached the received packet counter threshold RPCT 130 or if jitter violation counter JVC 138 has reached the jitter violation counter threshold 140. If neither of these conditions are true, then process flow returns to block 302, where the process waits for another packet to be received. If either of these conditions is true, however, the process flow moves to block 312.

At block 312, the value of JVC 138 is checked to see if it is zero. If so, this means that the condition in block 310, above, that triggered the re-evaluation was the receipt of the threshold number of packets defined by RPCT 130. If JVC 138 equals zero, then the process flow moves to block 314, which reduces jitter buffer size JBS 132 by the value defined by PACE 142.

At block 316, JBS 132 is compared to jitter buffer minimum size JBNS 136. If JBS 132 is less than the jitter buffer minimum size defined by JBNS 136, the process flow moves to block 318, where JBS 132 is set to JBNS 136, and then to block 320. If, in block 316, JBS 132 is not less than JBNS 136, the process flow moves directly to block 320.

Referring again to block 312, if the value of JVC 138 is not zero, process flow moves to block 322, where JVC 138 is compared to JVCT 140. If JVC 138 is greater than or equal to JVCT 140, then the process flow moves to block 324, which increases JBS 132 by the value defined by PACE 142.

At block 326, JBS 132 is compare to jitter buffer maximum size JBMS 134. If JBS 132 is greater than the jitter buffer maximum size defined by JBMS 134, the process flow moves to block 328, where JBS 132 is set to JBMS 134, and then to block 320. If, in block 326, JBS 132 is not greater than JBMS 134, the process flow moves directly to block 320.

At block 320, received packet counter RPC 128 and jitter violation counter JVC 132 are cleared, and process flow returns to block 302 and awaits the receipt of a new packet.

Thus, in the embodiment illustrated in FIG. 2, the size of the jitter buffer will be adjusted down if no jitter violations have occurred during the receipt of RPCT 130 number of packets, adjusted up if JVCT 140 number of jitter violations have occurred, and left unchanged if RPCT 130 number of packets have been received with the number of jitter violations detected being between 1 and JVCT 140.

In alternate embodiments, the values of RPCT 130, JVCT 140, PACE 142, etc., may also be adjusted based on performance statistics. For example, if a channel is "clean", i.e., has little or no jitter, and the jitter buffer size has already been set to the minimum size defined by JBNS 136, it may be advantageous to increase the value of RPCT 130 for that channel, so that the jitter buffer size re-evaluation occurs less often, freeing up processing resources within MGW 102. Likewise, the values of JVCT 140 and PACE 142 may be dynamically adjusted based on the performance history of a particular channel, node, or network.

In embodiments where each jitter buffer 118 is a circular buffer, MGW 102 may maintain information identifying or describing the buffer. For example, MGW 102 may maintain information indicating the location of the circular buffer in memory by storing the first and last memory addresses that make up the buffer, by storing the first address and a size value, and so on. This information may be stored within JB 118, context 126, jitter buffer adjustment module 122, or in another module within MGW 102.

It will be understood that various details of the subject matter described herein may be changed without departing from the scope of the subject matter described herein. Furthermore, the foregoing description is for the purpose of illustration only, and not for the purpose of limitation.

What is claimed is:
1. A system for providing adaptive jitter buffer management based on packet statistics for a media gateway, the system comprising:
    a media gateway for communicating data between entities in one or more telecommunication networks, the media gateway including: first and second network interfaces for interfacing with the one or more telecommunication networks;

a packet monitor for monitoring and maintaining packet statistics for channels established between the first and second network interfaces, wherein monitoring and maintaining packet statistics for channels established between the first and second network interfaces includes tracking a number of packets received for each channel and tracking a number of jitter violations that occur for each channel;

a plurality of per-channel jitter buffers for buffering packets for the channels; and a jitter buffer adjustment module for dynamically adjusting jitter buffer size on a per-channel basis based on the packet statistics maintained for each channel, wherein dynamically adjusting the jitter buffer size on a per-channel basis based on the packet statistics maintained for each channel includes adjusting the jitter buffer size for a channel if the tracked number of jitter violations for the channel reaches a jitter violation counter threshold for the channel, wherein the jitter violations includes excessive delay time between subsequent incoming packets;

wherein, the dynamically adjusting the jitter buffer size comprises increasing or decreasing the jitter buffer size by an adjustment value and if the adjustment value makes the jitter buffer size smaller than a minimum jitter buffer size, setting the jitter buffer size equal to the minimum buffer size and if the adjustment value makes the jitter buffer size greater than a maximum buffer size, setting the jitter buffer size equal to the maximum buffer size; and wherein the jitter violation counter is reset after dynamically adjusting the jitter buffer size.

2. The system of claim 1 wherein the one or more telecommunication networks include a first telecommunication network that uses a first protocol and a second telecommunication network that uses a second protocol different from the first protocol.

3. The system of claim 2 wherein the first protocol comprises a circuit-switched protocol and wherein the second protocol comprises a packet-switched protocol.

4. The system of claim 3 wherein the first protocol comprises a time division multiplexing (TDM) protocol.

5. The system of claim 3 wherein the second protocol comprises an Internet protocol (IP) protocol.

6. The system of claim 1 comprising a plurality of message processing modules for converting messages between a protocol used by messages on the first network interface and a protocol used by messages on the second network interface.

7. The system of claim 6 wherein each channel uses at least one of the plurality of message processing modules.

8. The system of claim 6 comprising at least one switch fabric for logically connecting the message processing modules to at least one of the network interfaces.

9. The system of claim 1 wherein each channel's jitter buffer comprises a first-in, first-out (FIFO) queue.

10. The system of claim 1 wherein the packet statistics maintained by the jitter buffer module include at least one of:
number of packets received for the channel;
number of packets received for all channels;
number of jitter violations received for the channel; and
number of jitter violations received for all channels.

11. The system of claim 1 wherein the jitter buffer adjustment module maintains, for each channel, information relating to at least one of:
a current jitter buffer size;
a minimum jitter buffer size allowed;
a maximum jitter buffer size allowed;
a received packet counter threshold;
a jitter violation counter threshold; and
a jitter buffer size adjustment factor.

12. A method for providing adaptive jitter buffer management based on packet statistics for a media gateway, the method comprising:
at a media gateway having first and second network interfaces for interfacing with one or more telecommunication networks:
receiving packets associated with a plurality of channels established between the first and second network interfaces;
buffering packets associated with the channels using per-channel jitter buffers;
monitoring and maintaining packet statistics for each channel, wherein monitoring and maintaining packet statistics for each channel includes tracking a number of packets received for each channel and tracking a number of jitter violations that occur for each channel; and
dynamically adjusting jitter buffer size on a per-channel basis based on the packet statistics maintained for each channel, wherein dynamically adjusting the jitter buffer size on a per-channel basis based on the packet statistics maintained for each channel includes adjusting the jitter buffer size for a channel if the tracked number of jitter violations for the channel reaches a jitter violation counter threshold for the channel, wherein the jitter violations include excessive delay time between subsequent incoming packets;
wherein, the dynamically adjusting the jitter buffer size comprises increasing or decreasing the jitter buffer size by an adjustment value and if the adjustment value makes the jitter buffer size smaller than a minimum jitter buffer size, setting the jitter buffer size equal to the minimum buffer size and if the adjustment value makes the jitter buffer size greater than a maximum buffer size, setting the jitter buffer size equal to the maximum buffer size; and
wherein the jitter violation counter is reset after dynamically adjusting the jitter buffer size.

13. The method of claim 12 wherein the one or more telecommunication networks include a first telecommunication network that uses a first protocol and a second telecommunication network that uses a second protocol different from the first protocol.

14. The method of claim 12 wherein the first protocol comprises a circuit-switched protocol and the second protocol comprises a packet-switched protocol.

15. The method of claim 14 wherein the first protocol comprises a time division multiplexing (TDM) protocol.

16. The method of claim 14 wherein the second protocol comprises an Internet protocol (IP) protocol.

17. The method of claim 12 wherein communicating information between two network entities comprises processing packets using at least one of a plurality of message processing modules for converting messages between a protocol used by the first network entity and a protocol used by the second network entity.

18. The method of claim 17 wherein each channel uses at least one of the plurality of message processing modules.

19. The method of claim 17 wherein communicating information between two network entities includes using at least one switch fabric for logically connecting the message processing modules to at least one of the telecommunication networks.

20. The method of claim 12 wherein providing the jitter buffer comprises providing a first-in, first-out (FIFO) queue.

21. The method of claim 12 wherein maintaining the packet statistics by the jitter buffer module includes maintaining at least one of:
  number of packets received for the channel;
  number of packets received for all channels;
  number of jitter violations received for the channel; and
  number of jitter violations received for all channels.

22. The method of claim 12 wherein the jitter buffer module maintains, for each channel, information relating to at least one of:
  a current jitter buffer size;
  a minimum jitter buffer size allowed;
  a maximum jitter buffer size allowed;
  a received packet counter threshold;
  a jitter violation counter threshold; and
  a jitter buffer size adjustment factor.

23. A non-transitory computer readable medium having stored thereon computer-executable instructions that when executed by the processor of a computer perform steps comprising: at a media gateway having first and second network interfaces for interfacing with one or more telecommunication networks:
  receiving packets associated with a plurality of channels established between the first and second network interfaces;
  buffering packets associated with the channels using per-channel jitter buffers;
  monitoring and maintaining packet statistics for each channel, wherein monitoring and maintaining packet statistics for each channel includes tracking a number of packets received for each channel and tracking a number of jitter violations that occur for each channel; and
  dynamically adjusting jitter buffer size on a per-channel basis based on the packet statistics maintained for each channel, wherein dynamically adjusting the jitter buffer size on a per-channel basis based on the packet statistics maintained for each channel includes adjusting the jitter buffer size for a channel if the tracked number of jitter violations for the channel reaches a jitter violation counter threshold for the channel, the jitter violations include excessive delay time between subsequent incoming packets;
  wherein, the dynamically adjusting the jitter buffer size comprises increasing or decreasing the jitter buffer size by an adjustment value and if the adjustment value makes the jitter buffer size smaller than a minimum jitter buffer size, setting the jitter buffer size equal to the minimum buffer size and if the adjustment value makes the jitter buffer size greater than a maximum buffer size, setting the jitter buffer size equal to the maximum buffer size; and
  wherein the jitter violation counter is reset after dynamically adjusting the jitter buffer size.

* * * * *